United States Patent [19]

Crowley

[11] Patent Number: 4,609,151
[45] Date of Patent: Sep. 2, 1986

[54] MATERIAL SPREADER HAVING MULTIPLE COMPARTMENTS AND MIXER

[76] Inventor: Thomas A. Crowley, 24450 Glenbrook Blvd., Euclid, Ohio 44117

[21] Appl. No.: 658,470

[22] Filed: Oct. 9, 1984

Related U.S. Application Data

[63] Continuation of Ser. No. 433,088, Oct. 6, 1982, abandoned.

[51] Int. Cl.⁴ .................... A01C 7/00; A01C 17/00
[52] U.S. Cl. .................... 239/656; 222/136; 222/242; 239/683
[58] Field of Search ............... 222/129, 135, 136, 236, 222/239, 292; 239/652, 683, 656, 663, 681; 366/310

[56] References Cited

U.S. PATENT DOCUMENTS

| | | |
|---|---|---|
| 316,019 | 4/1885 | Eberhart et al. |
| 683,512 | 10/1901 | Snead . |
| 1,485,028 | 2/1924 | Gunter .................... 222/129 X |
| 1,512,615 | 10/1924 | McBride .................... 222/135 |
| 1,834,670 | 12/1931 | Yett . |
| 2,234,343 | 8/1938 | Harrington . |
| 2,304,744 | 12/1942 | Snyder .................... 366/316 X |
| 2,460,605 | 2/1949 | Soissa .................... 222/129 X |
| 2,517,184 | 8/1950 | Elliott et al. |
| 2,540,540 | 2/1951 | Murphy .................... 222/242 X |
| 2,661,955 | 12/1953 | Sherer .................... 239/656 |
| 2,793,074 | 5/1957 | Fancil . |
| 2,886,334 | 5/1959 | Presler . |
| 2,941,811 | 4/1959 | Sherer . |
| 2,947,544 | 8/1960 | Hart .................... 222/135 X |
| 3,036,745 | 5/1962 | Johnson .................... 222/242 X |
| 3,153,494 | 10/1964 | Heider .................... 222/136 |
| 3,165,859 | 1/1965 | Waldrum .................... 239/683 |
| 3,374,956 | 3/1968 | Bazilli et al. |
| 3,394,892 | 7/1968 | Speicher . |
| 3,446,165 | 5/1969 | Magda et al. |
| 3,463,360 | 8/1969 | Dorfman . |
| 3,523,648 | 8/1970 | Garber . |
| 3,544,013 | 12/1970 | Dorfman . |
| 3,589,566 | 6/1971 | Rivest . |
| 3,807,643 | 4/1974 | Bowerman . |
| 3,974,967 | 8/1976 | Wallick et al. |
| 4,032,074 | 6/1977 | Amerine . |
| 4,106,703 | 8/1978 | Magada . |
| 4,106,704 | 8/1978 | McRoskey et al. |
| 4,196,678 | 4/1980 | Lore et al. |
| 4,258,634 | 3/1981 | Lore . |

FOREIGN PATENT DOCUMENTS

| | | | |
|---|---|---|---|
| 2622782 | 12/1977 | Fed. Rep. of Germany ...... | 239/656 |
| 1255888 | 1/1961 | France .................... | 366/316 |

Primary Examiner—Joseph F. Peters, Jr.
Assistant Examiner—Kevin P. Weldon
Attorney, Agent, or Firm—Watts, Hoffmann, Fisher & Heinke

[57] ABSTRACT

Apparatus for spreading dry or granular materials such as lawn seed and/or lawn treatment chemicals that includes a support frame 18 rollingly supported by a pair of wheels 14 and a hopper 12 attached to the support frame that defines four substantially isolated material compartments 55–58. Discharge openings 65–68 are associated with each compartment; the outflow of material through the discharge openings is controlled by shutter-like gates 65a–68a, two of which are remotely controlled by lever mechanisms 78, 87 mounted on operating handles 20a, the other two of which are adjustable by an arrangement mounted near the hopper. Material discharged through the openings falls into a blending chamber 90 that includes a blending disc 96 rotated by a vertical shaft 98 that is coupled to an axle 32 by a gear box 40 that is drivingly engaged by one or both wheels. A broadcast spinner 124 is mounted on the vertical shaft intermediate the mixing chamber and the gear box so that both the blending disc and broadcast spinner are rotated when the spreading apparatus is advanced. The material mixture discharged by the mixing chamber is changed by varying the position of the shutter member 65a–68a.

5 Claims, 6 Drawing Figures

MATERIAL SPREADER HAVING MULTIPLE COMPARTMENTS AND MIXER

This application is a continuation of application Ser. No. 433,088, filed Oct. 6, 1982, and now abandoned.

DESCRIPTION

1. Technical Field

The present invention relates generally to spreading devices used for lawn care and in particular to a spreading device for concurrently spreading multiple and diverse materials

2. Background Art

The care of both residential and commercial lawns requires the use of various chemicals such as fertilizers and pesticides to promote growth, enhance color, and to reduce the growth of weeds or undesirable grass strains such as crabgrass. Generally, these chemicals are spread over the lawn, periodically, during the year. The type and quantity of a chemical is usually determined by the time of year the action is taken, the present condition of the lawn, and the lawn qualities desired. Fertilizers may include fast and/or controlled released nitrogen, phosphorous, potassium, iron, pelletized lime and other ingredients. Pesticides may include herbicides for crabgrass and weed control, insecticides for insect control and fungicides for fungus control.

An ideal combination and quantity of fertilizers and pesticides will vary from lawn to lawn. Many factors affect the condition of a lawn and may include watering and mowing practices exercised between lawn treatments as well as soil and shade conditions. For this reason, a predetermined mixture of fertilizers and/or pesticides may not produce the optimal lawn characteristics.

Professional lawn care, that is, the application of fertilizers and other chemicals by specialized lawn care companies has been growing in popularity especially in the area of residential lawns. Generally, home owners turn to professional lawn services for the obvious reason of eliminating a task not often enjoyed by a home owner. However, another more important reason for turning to a professional lawn service is the belief that an expert lawn service technician can provide a lawn treatment that the home owner himself cannot apply due to his lack of knowledge, lack of specialized tools, etc.

Many lawn treatment chemicals are available to the lawn care industry for application to residential and commercial lawns. The industry has developed and suggested devices for spreading these chemicals. In the simplest treatment, a predetermined mixture of various fertilizers and/or pesticides are spread over the entire lawn area. The chemical mixture may be purchased from a supplier or alternately the individual ingredients may be purchased from the supplier and then mixed by the lawn service company. In some cases, the mixture applied may be a material commercially available to the home owner himself. In this instance, the treatment by a professional lawn service provides only a labor saving function for the home owner.

A mixture, is usually at best a poor compromise and may not provide an effective use of chemicals. It should be apparent that it is chemical wasteful to apply, for example, weed control in areas of the lawn where the risk of weed growth is negligible. It should also be obvious that sunny and shade areas of the lawn often require different fertilizer applications. Lawns often are not uniform in growth characteristics and some lawns may include "stress" areas requiring specialized treatment. Predetermined mixtures of fertilizers and/or pesticides cannot provide an optimal treatment because the ratio of the various chemicals cannot be manipulated.

Professional lawn care specialists have tried and suggested various methods and apparatus for providing a lawn treatment that is tailored to the condition of the lawn at the time of treatment. One method is to use one or more spreaders having different materials, or alternately changing materials in the hopper, and using these materials in areas of the lawn as needed. This method is obviously laborious and time consuming because it may require multiple passes over the lawn. Devices have also been suggested that include individualized compartments containing various lawn treatment materials which could be simultaneously spread upon the lawn at various ratios. In some of these devices, the flow rates out of the individual compartments would be preset prior to the lawn treatment and would thus spread a predetermined mixture of ingredients over the entire lawn.

U.S. Pat. No. 3,446,165 illustrates a motorized roller cart that includes a plurality of bins each having a gate valve for controlling the outflow of a material contained therein. The material discharged by the bins falls onto a moving belt which transfers the material to a broadcast spinner. Although this device would appear to be capable of spreading an adjustable mixture of ingredients onto a lawn, the device is rather complex and costly. Additionally, although various materials may be concurrently discharged onto the transfer belts, it is believed that a uniform dispersion of the chemicals is not achieved and therefore a nonuniform mixture is spread onto the lawn.

U.S. Pat. No. 4,106,703 illustrates a related device which is hand propelled and which also includes a plurality of bins arranged to discharge material onto a transfer belt. It is believed, that the device disclosed is rather cumbersome to use and requires excessive effort to push across a lawn. In addition, it is also believed that like the device in the previously described patent, a nonuniform dispersion of ingredients results.

It has been found that many residential lawns are small in size and do not require the use of complicated and motorized spreading equipment. It has also been determined that a simple, preferably hand propelled, apparatus capable of modifying the constituent mixture of the material being spread during the lawn application, would be extremely desirable.

DISCLOSURE OF THE INVENTION

The present invention provides a new and improved apparatus for spreading a mixture of dry or granular material such as seed and/or treatment chemicals onto a lawn in a single pass. The apparatus includes a hopper having multiple compartments containing individual treatment chemicals and a mixing mechanism for blending the chemicals discharged by the compartments, prior to distribution. In the preferred embodiment, at least one of the compartments includes a variable discharge control mechanism for adjusting the outflow of material from the compartment that is remotely controllable by an operator while the apparatus is being used. With the present invention, the mixture of the treatment chemicals can be modified during the lawn treatment operation itself so that different lawn areas can receive a different chemical mixture, if needed.

According to the invention, the spreading device comprises a support frame, a hopper attached to the frame that defines at least two, substantially isolated material containing compartments, and a mixing chamber for blending materials discharged from the individual compartments. The blended material is discharged from the mixing chamber onto a distribution device such as a broadcast spinner. The material blender is actuated by a drive arrangement that is activated whenever the spreading device is advanced.

Unlike prior suggested devices, the speading device of the present invention insures thorough mixing of the individual ingredients so that a uniform mixture is dispersed onto the lawn by the device. By providing a remote controlled flow rate for at least one of the compartments, the mixture can be changed during the lawn treatment, that is, while the spreading device is being advanced.

In the preferred embodiment, the hopper defines four individual compartments each having a discharge opening communicating with the mixing chamber. Although each opening could be equipped with a remotely controlled flow metering gate, in the illustrated embodiment two of the compartments are equipped with a metering gate having an adjustment mechanism located at or near the discharge opening, whereas the other two compartments are equipped with remotely controlled metering gates since it would be cumbersome and awkward for an operator to adjust four different metering gates while advancing the spreading device.

With the disclosed arrangement, the hoppers having remotely controlled gates would be filled with material such as fast release nitrogen or pesticides, the distribution of which could be expected to change during the lawn treatment depending on the condition of a particular area of the lawn. The other two hoppers would contain treatment material which would be uniformly dispersed over the entire lawn area such as control released nitrogen, pelletized lime, a potassium/phosphorous mix, etc. The latter two hoppers would be adjusted prior to the lawn treatment and would probably remain fixed throughout the treatment although the operator could stop and readjust the gates if necessary.

According to the preferred and illustrated embodiment, the support frame and hence the hopper and mixing chamber are supported for rolling motion by a pair of ground engaging wheels, at least one of which is rotatably coupled to an axle. A conventional gear box converts rotation in the axle into an actuating motion for the blending mechanism disposed within the mixing chamber. Preferably, the gear box rotatably couples a substantially vertical shaft to the axle so that rotation in the axle produces concurrent rotation in the shaft. One end of the shaft extends into the mixing chamber and drives a mixing disc disposed in the chamber.

According to a feature of the invention, the vertical shaft for driving the mixing disc also mounts a broadcast spinner below the mixing chamber. In particular, the spinner is positioned on the vertical shaft intermediate the gear box and the bottom of the mixing chamber. Thus, both the spinner and mixing disc are rotated whenever the spreading device is advanced.

According to a feature of the invention, the discharge of blended material from the mixing chamber onto the spinner is controlled by a remotely actuatable gate. In the preferred arrangement, the spreader frame includes a handle by which the spreader is pushed by an operator. The handle mounts levers and cable mechanisms that enable the operator to actuate the mixing chamber gate and/or the metering gates that control the flow rate of material from two of the compartments. In the illustrated embodiment, the gates comprise slidable, shutter-like members connected to the cable/lever mechanisms mounted on the handle, which move across the discharge openings in the compartments and mixing chamber. The position of the shutter member with respect to its associated opening determines the effective size of the opening thereby controlling the flow rate of material out of the compartments.

Although the gate associated with the mixing chamber can be placed in intermediate positions, in the preferred embodiment, the gate operates as a simple on/off control to commence and terminate flow out of the mixing chamber.

According to another feature of the invention, the blending disc includes a plurality of apertures extending substantially axially through the disc. This feature enhances mixing of the materials in the chamber.

Additional features will become apparent and a fuller understanding obtained in reading the following detailed description made in connection with the accompanying drawings.

BEST MODE FOR CARRYING OUT THE INVENTION

Figure 1:
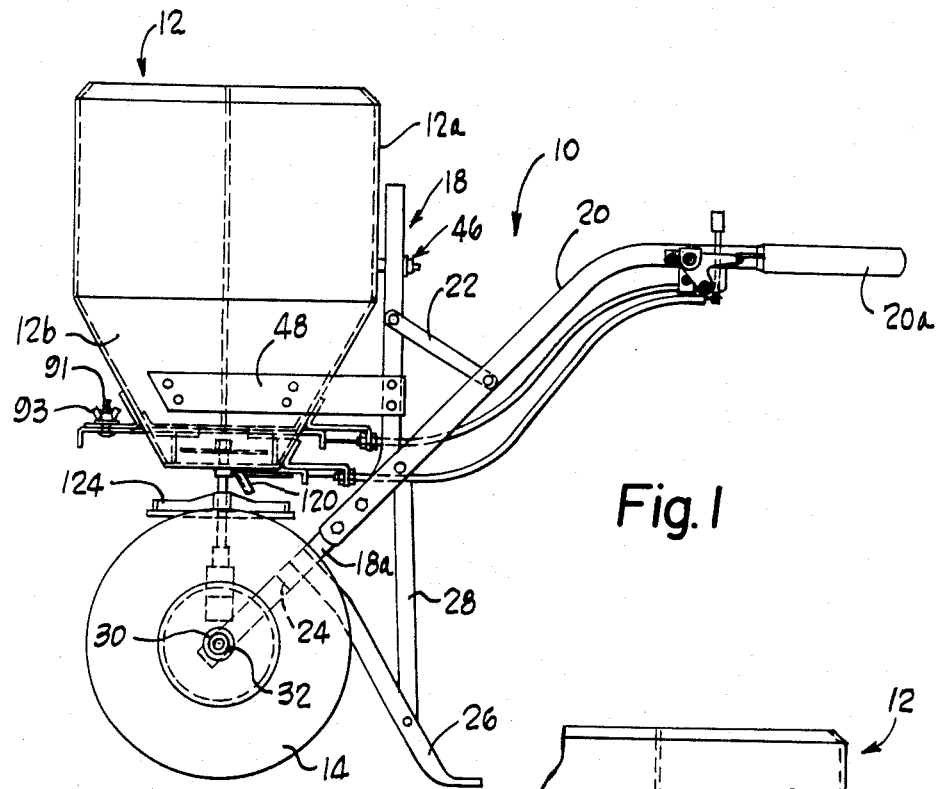
FIG. 1 is a side elevational view of a spreading apparatus constructed in accordance with the preferred embodiment of the invention.
Figure 2:
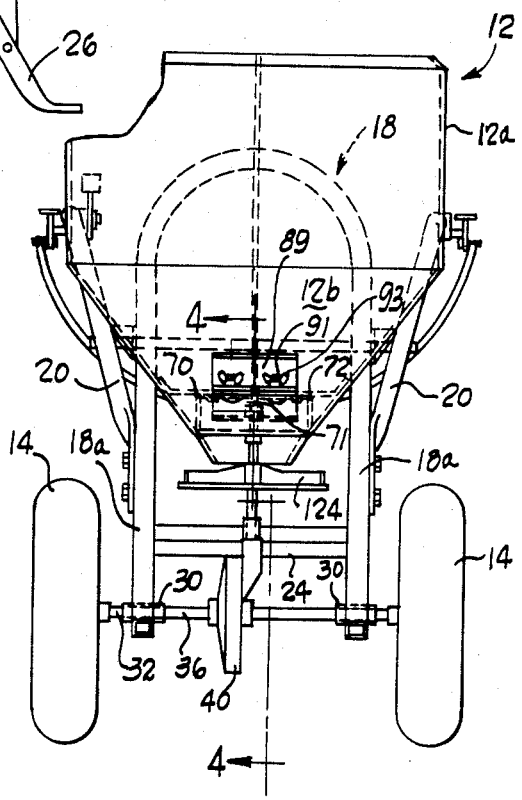
FIG. 2 is a front view of the spreading apparatus.
Figure 3:
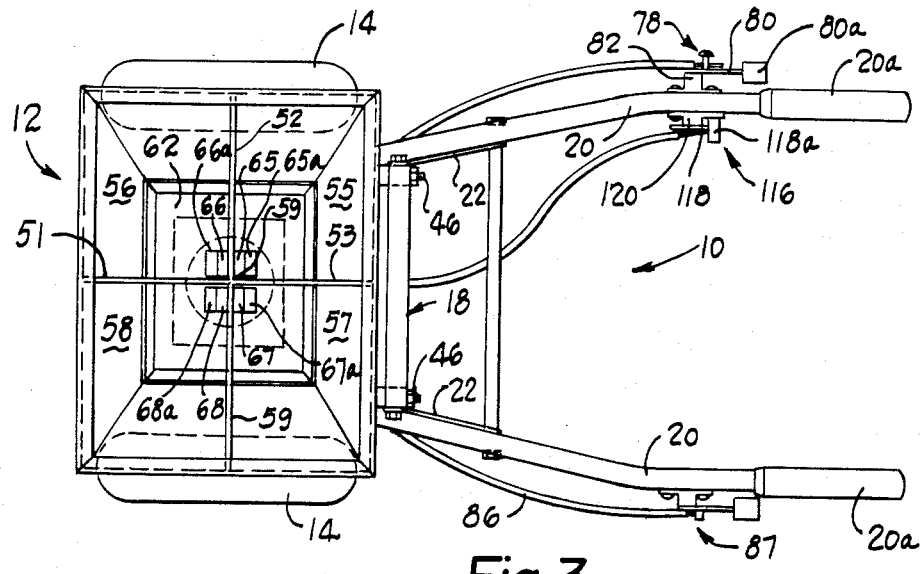
FIG. 3 is a top plan view of the spreading apparatus.

The overall construction of a spreading apparatus embodying the present invention can be seen in FIG. 1. Referring also to FIGS. 2 and 3, the spreader comprises a support frame indicated generally by the reference character 10, a hopper assembly 12 and a pair of ground engaging wheels 14. The frame 10 includes a primary support member 18 which as seen in FIG. 2 is substantially U-shaped in configuration, having a pair of parallel and angled legs 18a. Arms 20, bolted to the frame member legs 18a, extend upwardly therefrom and define operator handles 20a (shown best in FIG. 3) by which the spreader is grasped and propelled by an operator. Cross braces 22 extend between the frame member 18 and the arms 20. A cross member 24 extends between the bottoms of the legs 18a. A support stand 26 extends downwardly from the center of the cross member 24 and supports the spreader in an upright position when at rest. Vertical cross braces 28 extend between the arms 20 and the bottom of the stand 26 to provide added support for the stand.

As seen best in FIG. 2, a pair of bushings 30 is suitably mounted near the bottom ends of the frame legs 18a and rotatably support an axle 32 that extends between the legs 18a. At least one of the wheels 14 is rotatably coupled to the axle 32 so that rotation of the wheel produces concurrent rotation in the axle. An axle tube 36 extends between the bushings 30 and mounts a gear box 40. One or both wheels 14 may be pinned to the axle 32 or alternately, the wheels 14 may be releasably coupled to the axle 32 by clutch bearings or a gear arrangement (not shown) so that only rotation of the wheels in one direction produces attendant rotation in the axle.

The hopper 12 is secured to the frame member 18 by a pair of threaded fasteners 46 and by side plates 48 that are fastened to and extend between the sides of the hopper 12 and the sides of the frame member 18. In the illustrated spreader, the hopper 12 includes an upper section 12a, substantially rectangular in cross-section (as viewed in FIG. 3) and a lower, funnel-like section 12b. Referring in particular to FIG. 3, like section Referr wall partitions 51-54 are mounted inside the hopper 12 and define four substantially isolated compartments 55-58. The portions 51-54 meet near the center of the hopper as designated by the reference character 59. In the illustrated embodiment the partitions 52, 54 are defined by a unitary wall plate that extends across the width of the hopper. The partitions 51, 53 are formed by individual wall plates that join the unitary plate.

Figure 4:
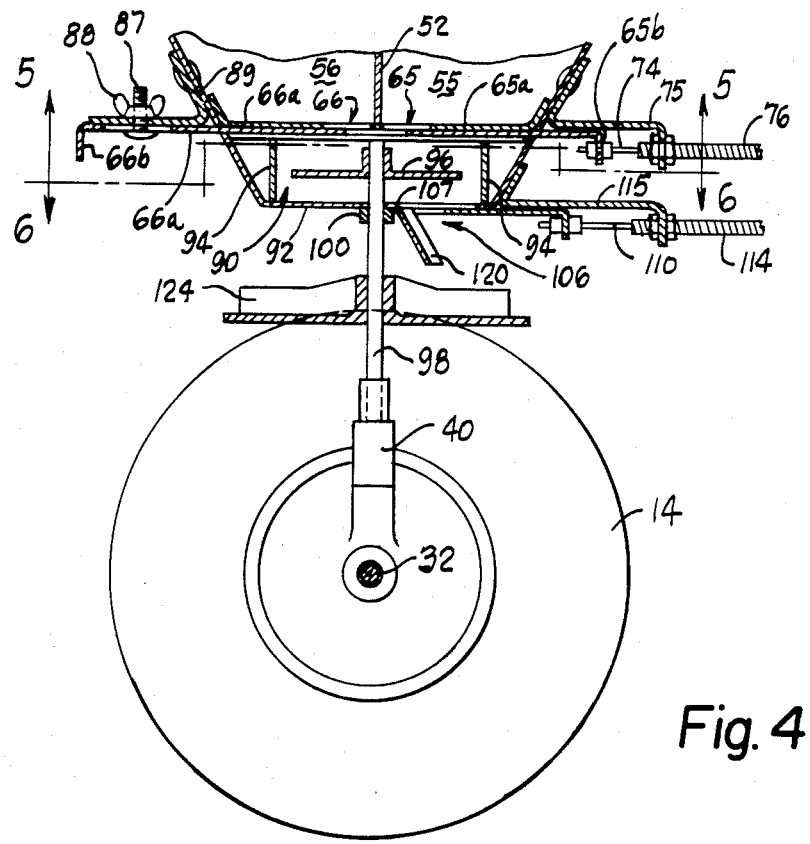
FIG. 4 is a fragmentary sectional view of the apparatus as seen from the plane indicated by the line 4—4 in FIG. 2.

As seen best in FIG. 4, a substantially horizontal compartment base plate 62 is suitably mounted near, but above, the bottom of the funnel section 12b of the hopper 12 and defines the bottom of the individual compartments 55-58. The wall partitions 51-54 extend from the top of the hopper 12 to the base plate 62.

The compartment base plate 62 defines discharge openings 65-68 through which material leaves the individual compartments 55-58 respectively. In actual construction, the individual openings 65-68 may be formed by a single, large aperture in the bore plate 62 that is centered with respect to the wall partition intersection point 59.

The effective size of the discharge opening and hence the rate of material flow out of the compartments 55-58 is determined by movable, shutter-like elements 65a-68a respectively. As seen in FIG. 4, the shutter elements 65a, 66a control the outflow of material from the compartments 55, 56, respectively. Similarly constructed shutter elements 67a, 68a (shown in FIG. 1 and 5) control the outflow of material from the compartments 57, 58 respectively. The shutters 65a-68a function as metering gates for controlling the rate of outflow of material from the compartments 55-58.

Figure 5:
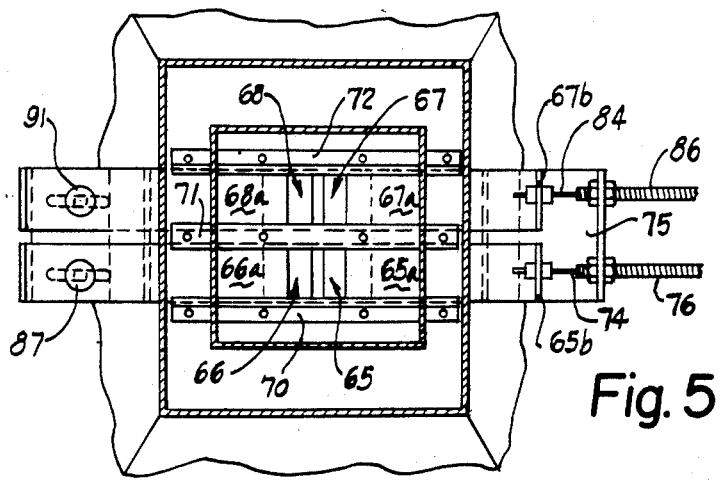
FIG. 5 is a sectional view of the spreading apparatus as seen from the plane indicated by the line 5—5 in FIG. 4.

Referring in particular to FIGS. 4 and 5, the shutters 65a-68a are slidably supported just below the compartment base plate 62. As seen best in FIG. 5, trackways 70-72 are suitably fastened, as by rivets, to the bottom of the bore plate 62. The outer trackways 70 and 72 support the outer edges of the shutters 65, 66 and 67, 68 respectively. The center trackway 71 is "T"-shaped in cross-section and provides common, sliding support for the inner edges of all the shutters 65-68. The profiles of the trackways 70-72 can be seen in FIG. 2. As seen in this figure, the outer trackways 70, 72 are a stretched "Z" in cross-section.

In the disclosed embodiment the shutter 65a is remotely controllable by the operator. For this purpose, the shutter 65a includes a downwardly extending flange 65b to which a cable 74 is suitably attached. A sheath 76 surrounds the cable 74 and is fixed with respect to the hopper by a mounting bracket 75. Both the cable and sheath extend up to the handle 20a and are connected to a lever mechanism, indicated generally by the reference character 78. As is known in the art, the mechanism 78 includes a lever 80 having an operating knob 80a that is pivotally attached to the handle 20a by means of a bracket 82. The cable 74 and sheath 76 are suitably connected to the mechanism 78 so that movement in the lever 80 extends and retracts the cable 74 thereby moving the shutter 65a to the left and to the right, respectively as viewed in FIG. 4. A similar arrangement is provided for remotely controlling the shutter 67a. In particular, a cable and sheath 84, 86 extend between the shutter 67a and the other handle 20a. A lever mechanism, indicated generally by the reference character 87 extends and retracts the cable 84.

Although a remotely controllable shutter can be provided in association with each of the discharge openings, in the illustrated embodiment, the shutters 66a, 68a which control the outflow of material from the front two compartments 56, 58 are adjusted and locked by an adjustment arrangement located on the hopper. As seen best in FIG. 4, the shutter 66a includes a downwardly depending flange 66b to facilitate gripping and movement of the shutter by the operator. Once the shutter is positioned by the operator (usually prior to commencing a lawn treatment) a suitable fastener, such as a bolt and wing nut 87, 88 locks the shutter 66a to a locking bracket 89 suitably fastened to the side of the hopper. The shutter 68a is similarly adjusted and locked to the bracket 89 by a bolt and wing nuts 91, 93.

In accordance with the invention, material leaving the individual compartments 55-58 through the discharge opening 65-68 drops into a common mixing chamber 90 formed at the bottom of the hopper 12. In the illustrated embodiment, the mixing chamber 90 is defined by the underside of the compartment base plate and a hopper bottom plate 92 fastened to the bottom of the hopper 12. Vertical walls 94 extend downwardly between the compartment base plate 62 and the hopper bottom plate 92 to further define the mixing chamber 90.

The mixing chamber 90 houses a blending device which in the preferred embodiment comprises a disc 96 rotatable within the chamber 90. Referring also to FIG. 2, a vertical shaft 98 extends upwardly from the gear box 40 and is journalled near its upper end by a bearing 100 mounted to the bottom plate 92. The shaft 98 is geared to the axle by the gear box 40 so that rotation in the axle, as effected by the wheels 14, produces concurrent rotation in the shaft 98 thus rotating the disc 96. As seen best in FIG. 4, the disc 96 is suitably fastened near the top of the shaft 98 and is positioned so the radial center plane of the disc is substantially in the center of the mixing chamber 90. In the preferred embodiment, the axis of the vertical shaft 98 is coincident with the intersection 59 of the wall partitions 51-54 so that the discharge openings 65-68 are symmetrically located with respect to the axis of the disc 96.

In operation, the disc 96 rotates as the spreader is advanced. Since the compartment discharge openings 65-68 are positioned above the disc 96, material falling through the openings, lands on the top surface of the disc and is immediately displaced radially so that the material on the disc passes under the other discharge openings. As a result, the materials falling from the individual compartments are comingled and mixed.

Figure 6:
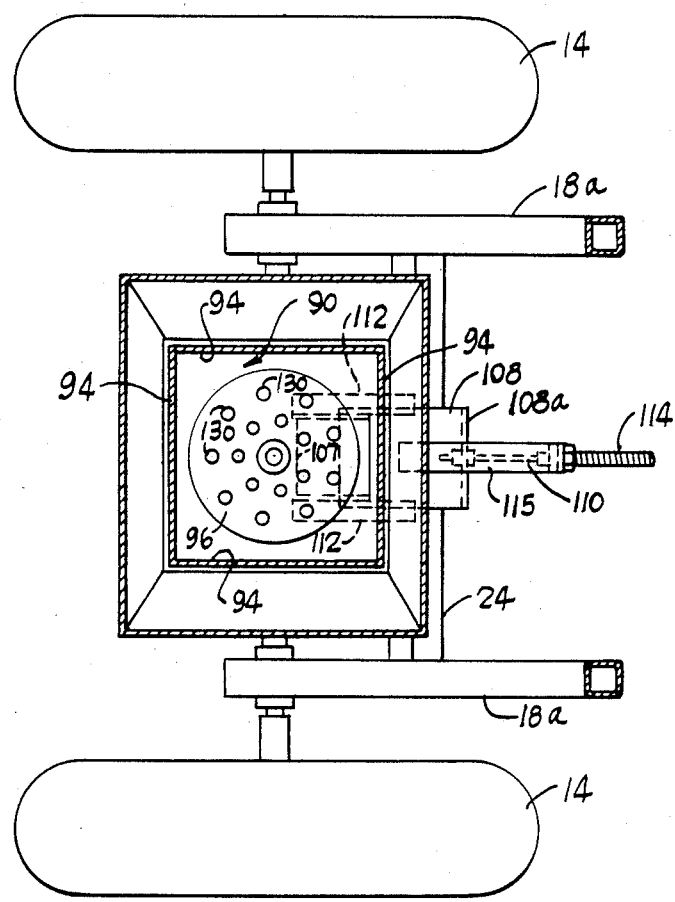
FIG. 6 is a sectional view of the spreading apparatus as seen from the plane indicated by the line 6—6 in FIG. 4.

The blended material eventually falls from the disc and is in turn discharged from the spreader through a gate, indicated generally by the reference character 106, disposed at the bottom of the mixing chamber 90. The gate 106 is formed by an aperture 107 on the bottom plate 92 and a shutter element 108 slidably supported under the bottom plate 92, which controls the effective size of the aperture 107. The shutter 108 is similar to the compartment metering shutters 65a–68a and is remotely controllable like the shutters 65a, 67a. In particular, the shutter member 108 includes a downwardly depending flange 108a to which a cable 110 is fastened. The shutter 108 is slidably supported under the base plate 92 by a pair of trackways 112 fastened to the bottom plate 92 and which slidably engage the side edges of the shutter 108. The trackways 112 are best seen in FIG. 6 and are similar to the trackways 70, 72. A sheath 114 surrounds the cable 110 and is fixed to a retainer bracket 115. The cable and sheath extend to the operating handle 20a and are suitably connected to a lever mechanism 116. Like the lever arrangement 78, the mechanism 116 includes a lever 118 and operating knob 118a pivotably mounted to a bracket 120 that is attached to the handle 20a. As is known in the art, movement in the control knob extends and retracts the cable to produce fore and aft movement in the shutter (left/right viewed in FIG. 4), thus opening and closing the mixing chamber discharge opening 107.

As seen in FIG. 4, a discharge trough 120 extends downwardly from the hopper bottom plate 92 at an angle and directs the blended material onto a distribution device 124, which in the preferred embodiment comprises a conventional broadcast spinner. The broadcast spinner 124 is mounted to the vertical shaft 98 intermediate the gear box 40 and the hopper bottom plate 92. With this disclosed construction, the spinner 124 and the blending disc 96 are rotated concurrently whenever the spreader is advanced.

Although the mixing chamber gate 106 can be positioned at intermediate positions, in the preferred method of operation, the gate is used as a simple on/off control. The compartment shutters 65a–68a are preferably used to modify the mixture ratio and therefore are normally adjusted at various intermediate positions depending on the desired mix of treatment chemicals.

In the disclosed apparatus, the blending disc 96 is formed with a plurality of radial apertures 130. It is believed, that the inclusion of apertures in the disc enhances the mixing function, especially when the mixing chamber 90 is completely filled with treatment chemicals.

The disclosed apparatus provides an inexpensive but effective way of providing a custom tailored lawn treatment application for both residential and commercial lawns. The mixing chamber 90 and mixing disc 96 enable the ratio of constituent materials to be adjusted during the lawn treatment even as the spreader is being advanced. It has also been found that after an adjustment by the operator (by manipulating the levers 78, 87) the mixture discharged from the mixing chamber 90 changes to the new mix level very rapidly. Morever, the disclosed apparatus uniformly distributes the blended materials onto the lawn.

As mentioned previously, although each of the compartment gates 65a–68a can be arranged to be remotely controllable by the operator, it has been found that two remotely contollable gates are sufficient for most treatment applications. For example, a lawn treatment may consist of the application of the following materials: (1) pre-mixed potassium and phosphorus, (2) controlled release nitrogen, (3) fast release nitrogen, and, (4) pesticide chemicals. To apply these chemicals to a lawn with one pass of the spreader, the potassium/phosphorous mix would be placed in one front compartment 56; controlled released nitrogen would be placed in the other front compartment 58. The pesticide and fast release nitrogen would be placed in the two rear compartments 55, 57. Prior to the lawn treatment, the gates 66a, 68a associated with the front two compartments 56, 58 would be preset to provide a predetermined flow rate of the potassium/phosphorous mix and controlled released nitrogen which are typically spread over the entire lawn. The discharge of pesticide and fast release nitrogen from the rear two compartments, would be remotely adjustable by the operator during the course of the treatment so that these materials are deposited in areas of the lawn only where needed.

Although the invention has been described with a certain degree of particularity, it should be understood that various changes can be made to it by those skilled in the art without departing from the spirit or scope as hereinafter claimed.

I claim:

1. A hand propelled device for spreading diverse granular material such as fertilizer, seeds or pesticides onto a lawn, comprising:
    (a) a support frame and a pair of ground engaging wheels for rollingly supporting said frame;
    (b) a hopper attached to the support frame defining at least two, substantially isolated, material compartments;
    (c) structure defining a discharge opening in a compartment base plate forming a part of each compartment;
    (d) a variable discharge control means associated with at least one of said discharge openings, said variable control means including an operator acfuable control mounted to said handle for remotely operating a metering gate for varying the effective size of said discharge opening;
    (e) a blending chamber disposed below said compartments and defined at least in part by an underside of said compartment base plate a transverse bottom plate and sidewalls extending from said compartment base plate to said bottom plate;
    (f) a blending disk disposed within said blending chamber, operative to blend material received in said blending chamber as the material is discharged from said discharge openings formed in said base plate, said blending disk and discharge openings arranged such that material discharged through said openings from said compartments falls onto an upper surface of said blending disk;
    (g) said blending disk including a plurality of through holes such that at least some of the material discharged from said discharge openings passes through said through holes whereas other material is carried by said disk for at least a portion of a revolution of said disk whereby blending of said material occurs as said material passes through said blending chamber;
    (h) said disk rotatable in a plane located intermediate said compartment base plate and said bottom plate;
    (i) drive means for imparting rotation to said disk whenever said device is advanced, said drive means including an axle drivingly engaged by at least one of said ground engaging wheels and means coupling rotation of said axle to said disk;

(j) said bottom plate defining an outlet located below said blending disk;

(k) remotely actuated on/off outlet control means for controlling the discharge of blended material from said blending chamber, through said outlet;

(1) distribution means including a broadcast spinner for distributing material discharged by said blending chamber along a predetermined path, said broadcast spinner operatively coupled to said drive means and rotatable in a plane substantially parallel to the plane of said blending disk.

2. The apparatus of claim 1 wherein said broadcast spinner is concurrently rotated whenever said blending disk is rotated.

3. A hand propelled device for spreading diverse granular material such as fertilizer, seeds or pesticides onto a lawn, comprising:

(a) a support frame and a pair of ground engaging wheels for rollingly supporting said frame;

(b) a hopper attached to the support frame defining four, substantially isolated, material compartments;

(c) structure defining a discharge opening in a compartment base plate forming a part of each compartment;

(d) a variable discharge control means associated with at least two of said discharge openings, said variable control means including an operator actuatable control mounted to said handle for remotely operating metering gates for varying the effective size of said two discharge openings;

(e) a blending chamber disposed below said compartments and defined at least in part by an underside of said compartment base plate, a transverse bottom plate spaced below said comparment base plate and sidewalls extending from said compartment base plate to said bottom plate;

(f) a blending disk disposed within said blending chamber, operative to continuously blend material discharged from said material compartments, said discharge openings of said compartments located above said blending disk such that material discharged from said compartments falls onto an upper surface of said blending disk;

(g) said blending disk including a plurality of through holes such that at least some of the material discharged from said discharge openings passes through said holes whereas other material is carried by said disk for at least a portion of a revolution of said disk whereby blending of said material occurs;

(h) said disk rotatable in a plane located intermediate said compartment base plate and said bottom plate;

(i) drive means including a shaft for imparting rotation to said disk whenever said device is advanced, said drive means including an axle drivingly engaged by at least one of said ground engaging wheels and means coupling rotation of said axle to said shaft;

(j) said shaft including an axis of rotation that is substantially aligned with a common juncture of said four material compartments;

(k) said bottom plate defining an outlet located below said blending disk;

(1) remotely actuated on/off outlet control means for controlling the discharge of blended material from said blending chamber through said outlet;

(m) distribution means including a broadcast spinner for distributing material discharged by said blending chamber along a predetermined path, said broadcast spinner operatively coupled to said shaft and rotatable in a plane substantially parallel to the plane of said blending disk.

4. The apparatus of claim 3 further comprising a variable discharge control means associated with each compartment.

5. The apparatus of claim 3 further including a discharge control means associated with the other of two said compartments that is manually adjustable by means located near said hopper.

* * * * *